United States Patent
Hayashi et al.

(10) Patent No.: US 10,811,997 B2
(45) Date of Patent: Oct. 20, 2020

(54) POWER CONVERSION DEVICE

(71) Applicant: DAIKIN INDUSTRIES, LTD., Osaka-shi, Osaka (JP)

(72) Inventors: Nobuo Hayashi, Osaka (JP); Takurou Ogawa, Osaka (JP); Morimitsu Sekimoto, Osaka (JP); Tomoisa Taniguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/648,591

(22) PCT Filed: Sep. 27, 2018

(86) PCT No.: PCT/JP2018/035995
§ 371 (c)(1),
(2) Date: Mar. 18, 2020

(87) PCT Pub. No.: WO2019/065859
PCT Pub. Date: Apr. 4, 2019

(65) Prior Publication Data
US 2020/0220481 A1  Jul. 9, 2020

(30) Foreign Application Priority Data
Sep. 29, 2017  (JP) ................... 2017-189301

(51) Int. Cl.
*H02P 27/08* (2006.01)
*H02M 7/5387* (2007.01)
(Continued)

(52) U.S. Cl.
CPC ..... *H02M 7/53871* (2013.01); *H02M 5/4585* (2013.01); *H02P 21/22* (2016.02); *H02P 27/08* (2013.01)

(58) Field of Classification Search
None
See application file for complete search history.

(56) References Cited

U.S. PATENT DOCUMENTS

2013/0214717 A1   8/2013  Ishikawa et al.
2017/0047739 A1*  2/2017  Berger ................... H02J 3/383
(Continued)

FOREIGN PATENT DOCUMENTS

JP   2002-51589 A    2/2002
JP   2015-195704 A  11/2015
(Continued)

OTHER PUBLICATIONS

International Search Report of corresponding PCT Application No. PCT/JP2018/035995 dated Nov. 27, 2018.
(Continued)

*Primary Examiner* — Bentsu Ro
(74) *Attorney, Agent, or Firm* — Global IP Counselors, LLP

(57) ABSTRACT

A power converter includes a plurality of switching elements, a converter circuit that rectifies an AC voltage of an AC power source, a DC link that receives output of the converter circuit and generates a DC voltage, an inverter circuit that converts the DC voltage into an AC voltage of a predetermined frequency through a switching operation, and a control unit that controls the switching operation. A capacitance value of a capacitor is set so that a maximum value of the DC voltage becomes twice or more of a minimum value. The control unit controls the switching elements such that two or more extrema appear in a power source half cycle in a waveform synthesized from second, fourth, and sixth harmonics that have a power source frequency as a fundamental frequency and are extracted from a waveform of an absolute value of a motor current vector.

2 Claims, 15 Drawing Sheets

(51) Int. Cl.
 *H02M 5/458* (2006.01)
 *H02P 21/22* (2016.01)

(56) References Cited

U.S. PATENT DOCUMENTS

2017/0279398 A1* 9/2017 Taniguchi ............... H02M 7/48
2018/0309389 A1   10/2018 Tagawa et al.

FOREIGN PATENT DOCUMENTS

| JP | 2017-17918 A | 1/2017 |
| WO | 2012/060357 A1 | 5/2012 |
| WO | 2017/009921 A1 | 1/2017 |
| WO | 2017/119214 A1 | 7/2017 |

OTHER PUBLICATIONS

International Preliminary Report of corresponding PCT Application No. PCT/JP2018/035995 dated Mar. 31, 2020.

* cited by examiner

POWER SOURCE PHASE

POWER SOURCE PHASE

POWER SOURCE PHASE

POWER SOURCE PHASE

POWER SOURCE PHASE

POWER SOURCE PHASE

US 10,811,997 B2

POWER CONVERSION DEVICE

CROSS-REFERENCE TO RELATED APPLICATIONS

This U.S. National stage application claims priority under 35 U.S.C. § 119(a) to Japanese Patent Application No. 2017-189301, filed in Japan on Sep. 29, 2017, the entire contents of which are hereby incorporated herein by reference.

BACKGROUND

Field of the Invention

The present invention relates to a power converter.

Background Information

One type of power converters converts power of an AC power source into any AC power. Some of the power converters of this type have a capacitor having a relatively small capacitance in a DC link to improve power factor (see, for example, Japanese Unexamined, Patent Publication No. 2002-51589).

SUMMARY

When electric power is supplied to a motor by the power converter of Japanese Unexamined Patent Publication No. 2002-51589, an effective value of a motor current tends to increase to decrease the efficiency of the motor. A peak torque of the motor also tends to increase, resulting in a decrease in an operating area. As a solution to this problem, the size of the motor can be increased, or the capacity of switching elements constituting an inverter circuit can be increased. However, this leads to an increase in size and cost of the converter. That is, alternative countermeasures are required.

In view of the foregoing problem, the present invention has been achieved, and an object of the present invention is to reduce a peak of an output torque of a motor of a power converter.

In order to achieve the object, a first aspect of the present invention is directed to a power converter having a plurality of switching elements (Su, Sv, Sw, Sx, Sy, Sz), the power converter being used for converting power inputted from an AC power source (20) into AC power of a predetermined frequency through a switching operation by the switching elements (Su, Sv, Sw, Sx, Sy, Sz) to supply the converted AC power to a motor (30). The power converter includes a control unit (40) for controlling the switching operation, wherein the control unit (40) controls the switching elements (Su, Sv, Sw, Sx, Sy, Sz) such that two or more extrema appear in a power source half cycle in a waveform synthesized from second, fourth, and sixth harmonics which have a power source frequency as a fundamental frequency and are extracted from a waveform of an absolute value of a motor current vector.

With this configuration, a peak of a motor torque a current) is reduced.

A second aspect is an embodiment of the first aspect. In the second aspect, the power converter further includes: a converter circuit (11) that rectifies an AC voltage of the AC power source (20); a DC link (12) that receives an output of the converter circuit (11) as an input and generates a DC voltage ($v_{dc}$) which pulsates in accordance with a frequency of the AC voltage; and an inverter circuit (13) that converts the DC voltage ($v_{dc}$) generated by the DC link (12) into an AC voltage of a predetermined frequency through the switching operation and outputs the converted AC voltage, wherein the control unit (40) controls the inverter circuit (13) such that the power source current ($i_{in}$) is nonconducting for a certain period.

With this configuration, the presence of a period in which the power source current ($i_{in}$) is nonconducting minimizes an effective value of a motor current.

A third aspect is an embodiment of the first or second aspect. In the third aspect, the control unit (40) controls the switching elements (Su, Sv, Sw, Sx, Sy, Sz) such that two or more extrema appear in a power source half cycle in a waveform obtained through multiplication of a waveform, that is synthesized from a fundamental wave, a third harmonic, and a fifth harmonic that are extracted from a waveform of a power source current ($i_{in}$), by polarity of the voltage of the AC power source (20).

According to the first aspect, in the power converter for converting the power of the AC power source into any AC power, the peak of the output torque of the motor at a predetermined load can be reduced.

Further, according to the second aspect, the presence of a period in which the power source current is nonconducting can minimize the effective value of the motor current at a predetermined load. This makes it possible to minimize either the effective value of the motor current or the peak of the output torque of the motor.

DETAILED DESCRIPTION OF EMBODIMENT(S)

Embodiments of the present invention will be described in detail below with reference to the drawings. The embodiments below are merely exemplary ones in nature, and are not intended to limit the scope, applications, or use of the present invention.

First Embodiment

Figure 1:
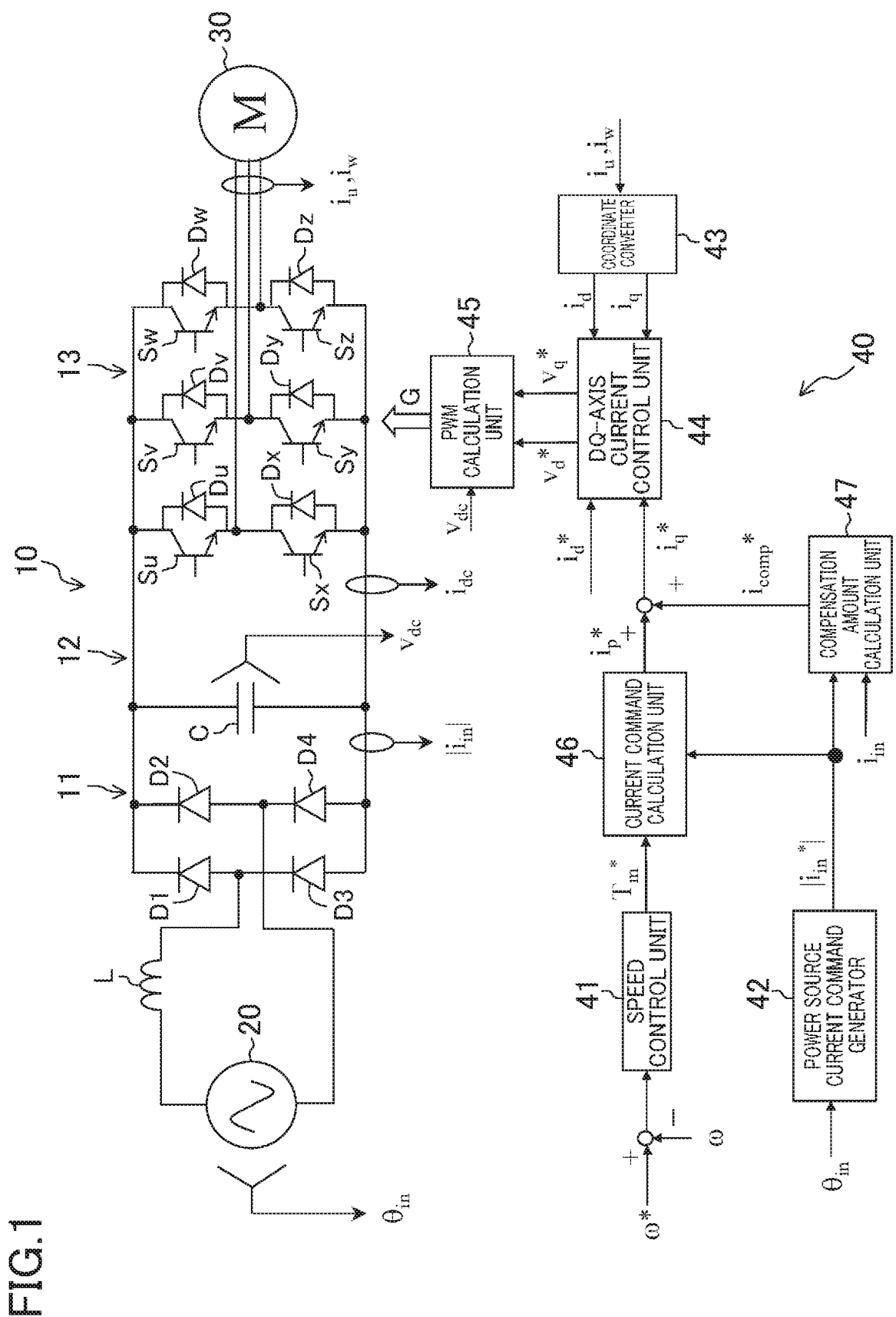
FIG. 1 is a block diagram illustrating a configuration of a power converter according to a first embodiment.

FIG. 1 is a block diagram illustrating a configuration of a power converter (10) according to a first embodiment of the present invention. The power converter (10) converts an input AC voltage (in this example, a power source voltage ($v_{in}$) supplied from a single-phase AC power source (20)) into a predetermined output AC voltage, and supplies the converted AC voltage to a motor (30). In this embodiment, as shown in FIG. 1, the power converter (10) includes a converter circuit (11), a DC link (12), an inverter circuit (13), and a control unit (40). The motor (30) may be, for example, an interior permanent magnet (IPM) motor, and in this embodiment, drives a compressor (not shown) of an air conditioner.

<Converter Circuit>

The converter circuit (11) is connected to the AC power source (20) via a reactor (L), and performs fill-wave rectification of the power source voltage ($v_{in}$) from the AC power source (20). In this example, the converter circuit (11) is provided with four diodes (D1, D2, D3, D4) which are connected in a bridge shape. Specifically, the converter circuit (11) is constituted of a diode bridge circuit.

<DC Link>

The DC link (12) has a capacitor (C) connected between a pair of output nodes of the converter circuit (11), and inputs an output (i.e., a full-wave-rectified power source voltage ($v_{in}$)) of the converter circuit (11) to generate a DC voltage ($v_{dc}$). The DC voltage ($v_{dc}$) pulsates in accordance with the frequency of the power source voltage ($v_{in}$).

Figure 2:
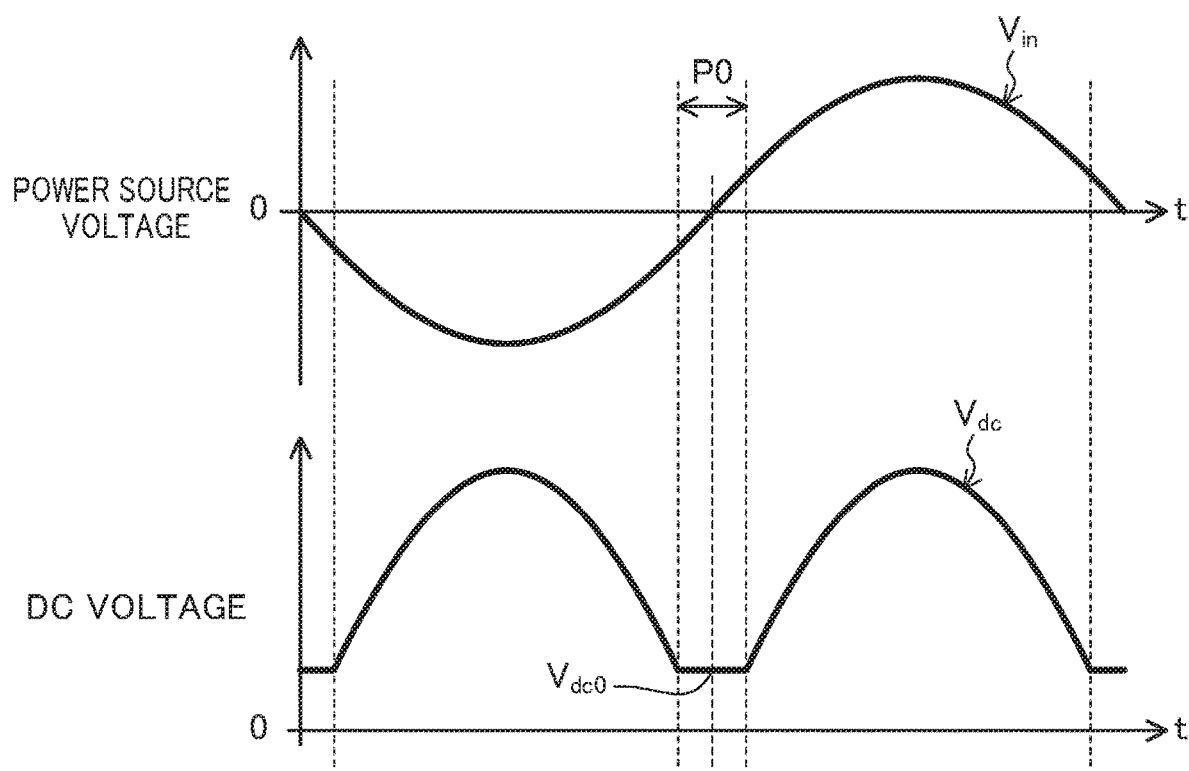
FIG. 2 illustrates examples of waveforms of a power source voltage and a DC voltage.

Now, the reason why the DC voltage ($v_{dc}$) contains the pulsation component according to the frequency of the power source voltage ($v_{in}$) will be described below. A capacitance value of the capacitor (C) of the DC link (12) is set so that the output of the converter circuit (11) is hardly smoothed, and that a ripple voltage (voltage fluctuation according to the switching frequency) derived from a switching operation (which will be described later) of the inverter circuit (13) can be reduced. Specifically, the capacitor (C) is constituted of a small-capacitance capacitor (e.g., a film capacitor) having a capacitance value (e.g., about several ten μF) of about 0.01 times the capacitance value of a smoothing capacitor (e.g., an electrolytic capacitor) used for smoothing the output of the converter circuit in a general power converter. Since the capacitor (C) is configured in this manner, the output of the converter circuit (11) is hardly smoothed in the DC link (12), and as a result, the pulsation component according to the frequency of the power source voltage ($v_{in}$), i.e., a pulsation component having a frequency twice the frequency of the power source voltage ($v_{in}$) in this example, remains in the DC voltage ($v_{dc}$). For example, the DC voltage ($v_{dc}$) pulsates such that its maximum value is twice or more the minimum value thereof. FIG. 2 shows examples of waveforms of the power source voltage ($v_{in}$) and the DC voltage ($v_{dc}$).

<Inverter Circuit>

The inverter circuit (13) has a pair of input nodes connected to both ends of the capacitor (C) of the DC link (12), and converts the DC voltage ($v_{dc}$) generated by the DC link (12) into an output AC voltage through a switching operation and supplies the converted AC voltage to the motor (30). In this example, the inverter circuit (13) includes six switching elements (Su, Sv, Sw, Sx, Sy, Sz) which are bridge-connected to each other and six freewheeling diodes (Du, Dv, Dw, Dx, Dy, Dz) in order to supply the three-phase output AC voltage to the motor (30). Specifically, the inverter circuit (13) includes three switching legs each connecting two switching elements together in series. On each of the three switching legs, the midpoint between the switching element (Su, Sv, Sw) of an upper arm and the switching element (Sx, Sy, Sz) of a lower arm is connected to an associated one of coils (u-phase coil, v-phase coil, w-phase coil) of the motor (30). The six switching diodes (Su, Sv, Sw, Sx, Sy, Sz) are respectively connected in antiparallel to the six freewheeling diodes (Du, Dv, Dw, Dx, Dy, Dz).

<Control Unit>

The control unit (40) includes a microcomputer and a memory device storing software for controlling the microcomputer. The control unit (40) controls the output (output AC voltage) of the inverter circuit (13) by controlling the switching operation of the inverter circuit (13) so that the number of rotations (ω) of the motor (30) reaches a given command value (will be hereinafter referred to as a "rotation number command value (ω*)"). Thus, the driving of the motor (30) is controlled.

In controlling this switching operation, the control unit (40) of the present embodiment controls the waveform of an input current to the converter circuit (11) (may be hereinafter referred to as a "power source current ($i_{in}$)"). Specifically, the control unit (40) controls the inverter circuit (13) such that two or more extrema appear in a power source half cycle in a waveform obtained through multiplication of a waveform, which is synthesized from a fundamental wave, a third harmonic, and a fifth harmonic that are based on a fundamental frequency of the voltage of the AC power source (20) and are extracted from a waveform of the power source current ($i_{in}$) inputted to the converter circuit (11), by the polarity of the voltage of the AC power source (20). Note that the "power source half cycle" refers to half the cycle of the voltage of the AC power source (20) (the same applies hereinafter).

In order to perform such control, the control unit (40) includes a speed control unit (41), a power source current command generator (42), a coordinate converter (43), a dq-axis current control unit (44), a PWM calculation unit (45), a current command calculation unit (46), and a compensation amount calculation unit (47), as shown in FIG. 1.

The speed control unit (41) performs, for example, proportional-integral-differential (PID) operation based on a deviation between the number of rotations (ω) of the motor (30) and the rotation number command value (ω*), thereby generating a command value of an average motor torque ($T_m$) (will be hereinafter referred to as an "average torque command value ($T_m$*)). The average torque command value ($T_m$*) is outputted to the current command calculation unit (46).

Figure 3:
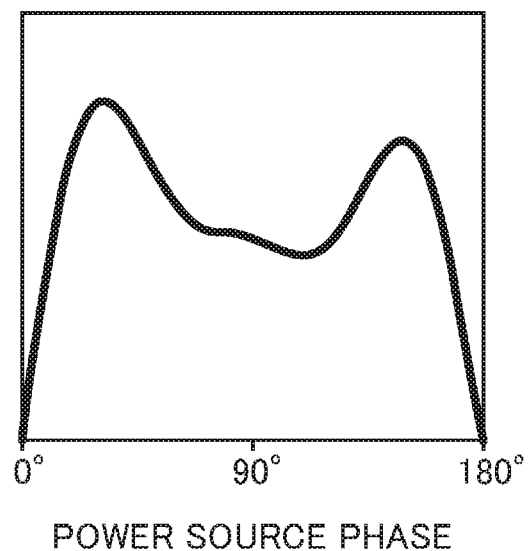
FIG. 3 illustrates an example of a waveform of a power source current command value.

The power source current command generator (42) generates a command value (will be hereinafter referred to as a "power source current command value ($|i_{in*}|$)) that pulsates in accordance with the frequency (e.g., 50 Hz) of the power source voltage ($v_{in}$) based on a phase angle of the power source voltage ($v_{in}$) (will be hereinafter referred to as a "power source phase ($θ_{in}$)"). The power source current command value ($|i_{in*}|$) is generated such that two or more extrema appear in a power source half cycle in a waveform obtained through multiplication of a waveform, which is synthesized from a fundamental wave, a third harmonic, and a fifth harmonic that are extracted and based on the fundamental frequency of the voltage of the AC power source (20), by the polarity of the voltage of the AC power source (20). FIG. 3 shows an example of a waveform of the power source current command value ($|i_{in*}|$). The waveform shown in FIG. 3 is a plot of the power source current command value ($|i_{in*}|$) in the power source half cycle. As shown in FIG. 3, the waveform of the power source current command value ($|i_{in*}|$) has one extremum that appears in each of the first half and the second half.

Figure 4:
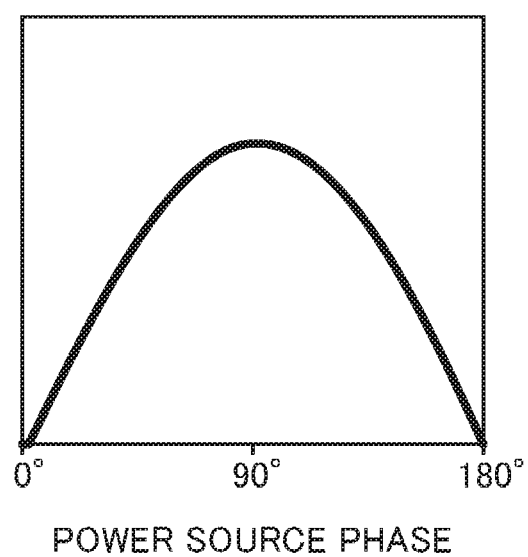
FIG. 4 illustrates an example of a power source current command value in a conventional power converter.
Figure 5:
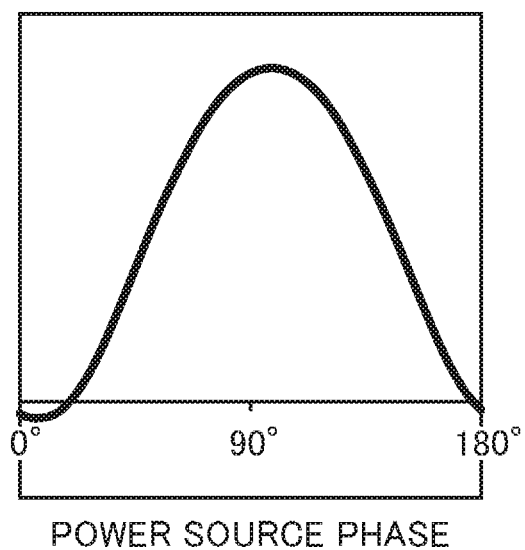
FIG. 5 illustrates an example of a waveform of an output torque of a motor driven by the conventional power converter.
Figure 6:
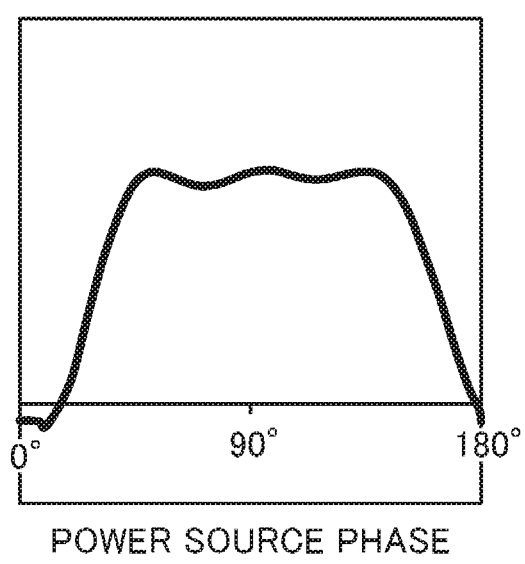
FIG. 6 illustrates an example of a waveform of the output torque of the motor according to the first embodiment.

For reference, FIG. 4 shows an example of a power source current in a conventional power converter whose DC link is provided with a capacitor having a relatively small capacitance to improve a power factor (will be hereinafter simply referred to as a "conventional power converter"). In the conventional power converter, the power source current command value ($|i_{in*}|$) has a single large maximum value in the power source half cycle. In contrast, in this embodiment, the power source current command value ($|i_{in*}|$) is generated such that two or more (two in this example) extrema appear in the power source half cycle. Generating the power source current command value ($|i_{in*}|$) in this manner makes it possible to generate a waveform shown in FIG. 6 (roughly speaking, a trapezoidal waveform) in which the single large maximum value, which appears in the torque of the motor in the conventional power converter shown in FIG. 5, is reduced according to the present embodiment. Note that each of FIGS. 5 and 6 show the waveform in the power source half cycle.

Figure 7:
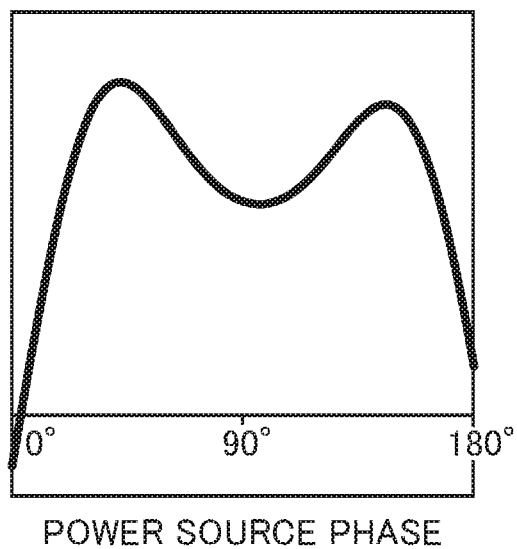
FIG. 7 illustrates an example of a waveform obtained through extraction and synthesis of a fundamental wave, a third harmonic, and a fifth harmonic which are based on a fundamental frequency of a voltage of an AC power source.

Next, FIG. 7 shows a waveform obtained through multiplication of a waveform, which is synthesized from the fundamental wave, the third harmonic, and the fifth harmonic that are extracted and based on the fundamental frequency of the voltage of the AC power source (20), by the polarity of the voltage of the AC power source (20), when the power source current command value ($|i_{in*}|$) shown in FIG. 3 is used. FIG. 7 clearly indicates that two maximum values appear when the fundamental wave, the third harmonic, and the fifth harmonic are superimposed.

Figure 8:
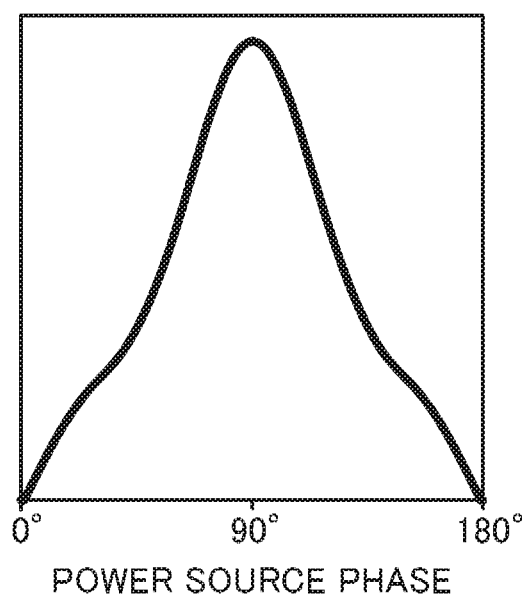
FIG. 8 illustrates a waveform of a power source current in which a peak of a motor torque is difficult to reduce.
Figure 9:
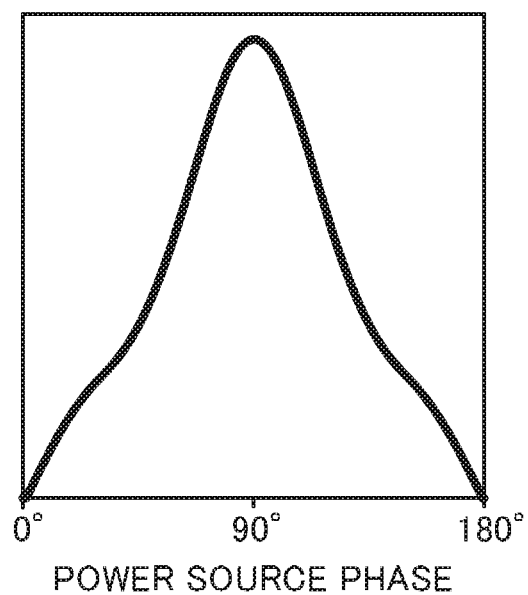
FIG. 9 illustrates a waveform obtained through multiplication of a waveform, which is obtained through extraction and synthesis of the fundamental wave, the third harmonic, and the fifth harmonic which are based on the fundamental frequency of the voltage of the AC power source, by polarity of a voltage of an AC power source.
Figure 10:
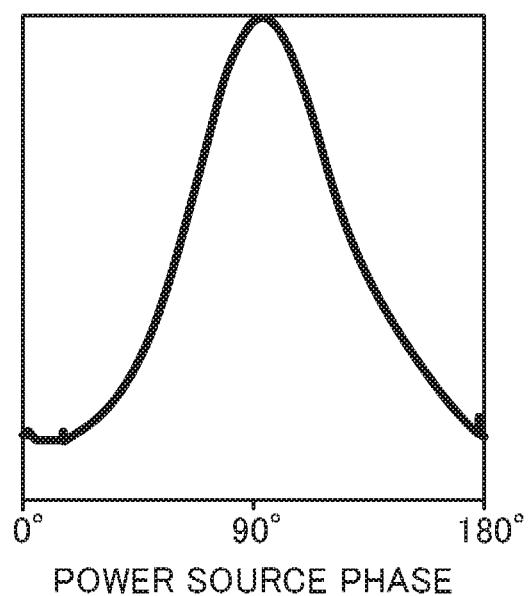
FIG. 10 illustrates a waveform of a motor torque corresponding to the power source current of FIG. 8.

If the phases of the fundamental wave, the third harmonic, and the fifth harmonic are inappropriate, the peak of the motor torque cannot be minimized. For example, based on a power source current waveform shown in FIG. 8, FIG. 9 shows a waveform obtained through multiplication of a waveform, which is synthesized from a fundamental wave, a third harmonic, and a fifth harmonic that are extracted and based on a fundamental frequency of the voltage of the AC power source (20), by the polarity of the voltage of the AC power source (20). FIG. 10 shows a waveform of the motor torque based on the power source current waveform shown in FIG. 8. It can be understood from FIG. 10 that the peak of the motor torque is greater than that in the case where the conventional power converter is used (see FIG. 5). Specifically, in order to reduce the peak of the motor torque, the harmonics need to be properly superimposed to generate a desired power source current waveform.

Figure 11:
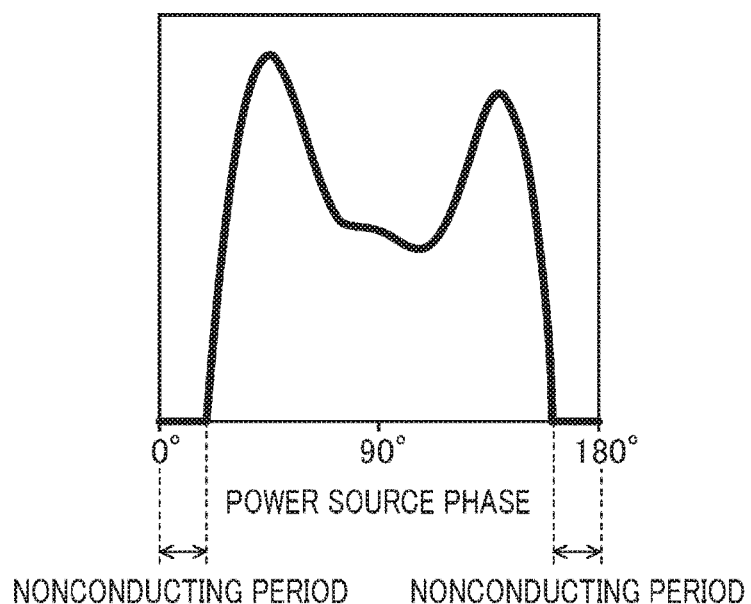
FIG. 11 illustrates another example of the waveform of the power source current command value.

Note that the power source current command generator (42) can generate the power source current command value ($|i_{in*}|$) such that the power source current ($i_{in}$) is nonconducting for a predetermined period around a zero crossing point (in this example, a predetermined period including the zero crossing point). FIG. 11 illustrates a power source current command value ($|i_{in*}|$) in the case where the nonconducting period is present. As shown in FIG. 11, there are periods in which the power source current command value ($|i_{in*}|$) is zero at both ends of the waveform of the power source current command value ($|i_{in*}|$). Due to the presence of the nonconducting periods in the power source current as shown in FIG. 11, the value Vdc0 shown in FIG. 2 can be further increased than that of the example shown in FIG. 3. This can reduce the d-axis current, and can minimize the effective value of the motor current. That is, a choice can be made whether to minimize the peak of the motor current or to minimize the effective value of the motor current, depending on the length of the nonconducting period.

In order to generate the power source current command value ($|i_{in*}|$) as described above, the power source current command generator (42) of the present embodiment is configured to read out the power source current command value ($|i_{in*}|$), which has been calculated off-line in advance (more specifically, at the design stage) with respect to various power source phases ($θ_{in}$) and stored in the memory device in the form of a table or a function (will be hereinafter referred to as "tables"), using the power source phase ($θ_{in}$) as an argument. The power source current command value ($|i_{in*}|$) calculated in this manner has the waveform in the power source half cycle as shown in FIG. 3 or 11.

The current command calculation unit (46) generates a pulsation command value ($i_p$*) which will be the basis of a command value of the q-axis current ($i_q$) (will be hereinafter referred to as a "q-axis current command value ($i_q$*)"). To generate the pulsation command value ($i_p$*), the following Formulae (1) to (8) are used.

$$v_{dc}(t) = |v_{in}(t)| - L\frac{d|i_{in}(t)|}{dt} \quad (1)$$

$$i_c(t) = C\frac{dv_{dc}(t)}{dt} \quad (2)$$

$$i_{inv}(t) = i_{in}(t) - i_c(t) \quad (3)$$

$$p_{inv}(t) = v_{dc}(t)i_{inv}(t) \quad (4)$$

-continued $$p_{inv}(t) = \left(|v_{in}(t)| - L\frac{d|i_{in}(t)|}{dt}\right)\left(i_{in}(t) - C\frac{d}{dt}\left(|v_{in}(t)| - L\frac{d|i_{in}(t)|}{dt}\right)\right) \quad (5)$$

$$P_{inv}(t) \approx \omega T_{in}(t) \quad (6)$$

$$T_{in}(t) = p_n i_q(t)(\Phi + (L_d - L_q)i_d(t)) \quad (7)$$

$$P_{inv}(t) \propto i_q(t) \quad (8)$$

In these formulae, $v_{in}$ denotes the power source voltage, $i_{in}$ the power source current, and $v_{dc}$ the voltage of the capacitor (C). $P_{inv}$ is the output power of the inverter circuit (13), L the inductance in the reactor (L), and C the capacitance of the capacitor (C). Further, $i_d$ denotes the cl-axis current, $i_q$ the q-axis current, $T_m$ the average motor torque, and pn the number of motor pole pairs. In these formulae, "(t)" applied to the end of each variable indicates that each variable is a value at time t. It is assumed that no loss is present in the converter circuit (11) and the inverter circuit (13) for the sake of simplicity.

Figure 12:
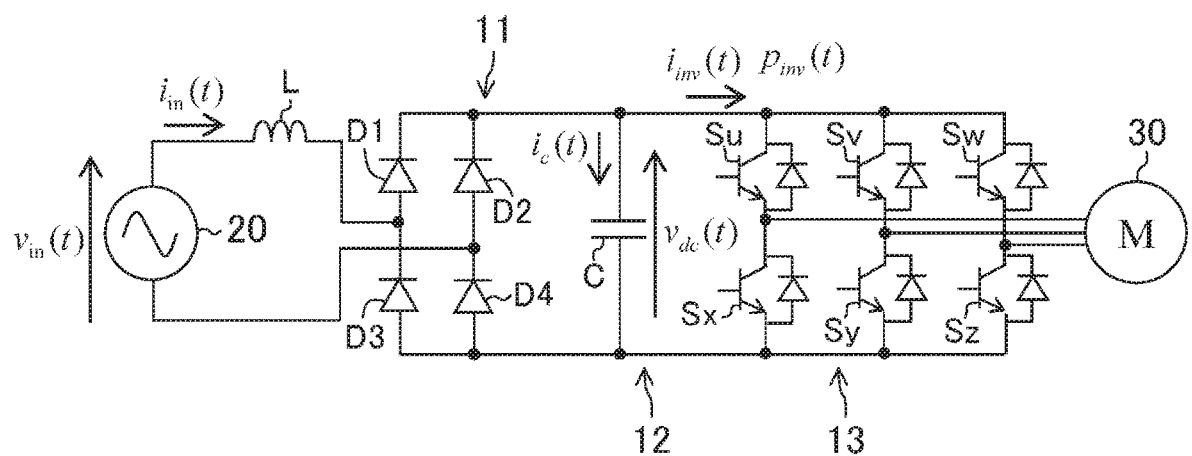
FIG. 12 illustrates the relationship between parameters and a circuit in Formulae (1) to (5).

For example, Formulae (1) to (4) are expressions derived from the relationship between current and voltage in each part of the circuit (see FIG. 1) constituting the power converter (10). FIG. 12 shows the relationship between the parameters and the circuit in these formulae. As can be seen from Formulae (1) to (5), the inverter power ($P_{inv}$) can be derived from a target value of an absolute value of the power source current ($i_{in}$) (i.e., the power source current command value ($|i_{in*}|$)). Since the inverter power ($P_{inv}$) and the motor output (see the right side of Formula (6)) are approximately equal, Formula (6) holds true. The average motor torque ($T_m$) can be represented by Formula (7). As can be seen from Formula (7), under a condition where the d-axis current ($i_d$) is constant, the average motor torque ($T_m$) is proportional to the q-axis current ($i_q$).

Accordingly, the q-axis current ($i_q$) is approximately proportional to the inverter power ($P_{inv}$), as represented by Formula (8). Thus, for example, when the inverter power ($P_{inv}$) is normalized such that the average value becomes one and multiplied by the average torque command value ($T_m*$), the command value, which will be the basis of the q-axis current ($i_q$) (i.e., the pulsation command value ($i_p*$)), can be calculated.

The compensation amount calculation unit (47) calculates and outputs a compensation amount (will be hereinafter referred to as a "q-axis c exit command compensation amount ($i_{comp}*$)") to reduce the deviation between the power source current command value ($|i_{in*}|$) and the absolute value of the power source current ($i_{in}$). In this example, the compensation amount calculation unit (47) performs, for example, proportional-integral (PI) operation based on the deviation between the power source current command value ($|i_{in}*|$) and the absolute value of the power source current ($i_{in}$), thereby obtaining the q-axis current command compensation amount ($i_{comp}*$).

Figure 13:
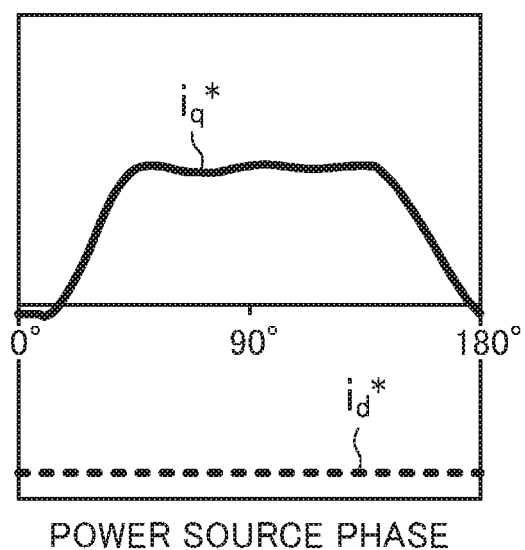
FIG. 13 illustrates examples of waveforms of a q-axis current command value and a d-axis current command value according to the first embodiment.

The q-axis current command compensation amount ($i_{comp}*$) is added to the pulsation command value ($i_p*$), and the addition result is outputted to the dq-axis current control unit (44) as the q-axis current command value ($i_q*$). FIG. 13 shows examples of the waveforms of the q-axis current command value ($i_q*$) and the d-axis current command value ($i_d*$) according to the present embodiment. The waveforms are plots of the values in the power source half cycle. For reference, FIG. 14 illustrates examples of waveforms of the q-axis current command value ($i_q*$) and the d-axis current command value ($i_d*$) in the conventional power converter.

Figure 14:
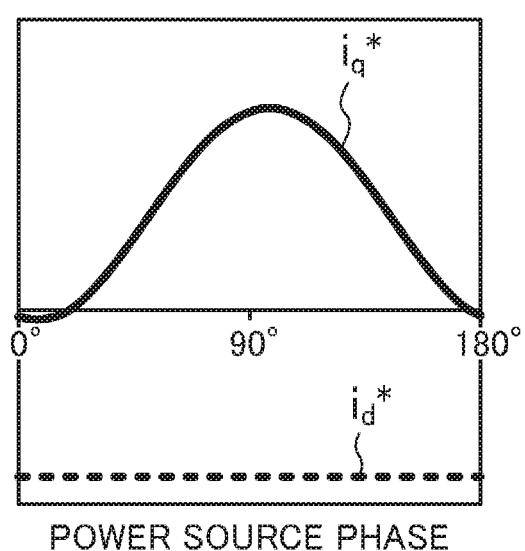
FIG. 14 illustrates examples of waveforms of a q-axis current command value and a d-axis current command value in the conventional power converter.

The waveforms shown in FIG. 14 are also plots of the values in the power source half cycle.

As can be seen from FIGS. 13 and 14, the q-axis current command value ($i_q*$) of the present embodiment has a waveform (roughly speaking, a trapezoidal waveform) in which a single large maximum value that appears in the power source half cycle in the conventional power converter is reduced. In this example, the d-axis current command value ($i_d*$) is a constant value.

The coordinate converter (43) performs so-called dq conversion based on a u-phase current (iu), a w-phase current (iw), and an electrical angle (motor phase (θm)) of a rotor (not shown) of the motor (30), to derive the d-axis current ($i_d$) and q-axis current ($i_q$) of the motor (30). The values of the u-phase current (iu) and a v-phase current (iv) can be directly detected by providing a current sensor, for example.

The dq-axis current control unit (44) derives a d-axis voltage command value ($v_d*$) and a q-axis voltage command value ($v_q*$) based on the d-axis current command value ($i_d*$), the q-axis current command value ($i_q*$), the d-axis current ($i_d$), and the q-axis current ($i_q$). Specifically, the dq-axis current control unit (44) derives the d-axis voltage command value ($v_d*$) and the q-axis voltage command value ($v_q*$) to reduce the deviation between the d-axis current command value ($i_d*$) and the d-axis current ($i_d$), and the deviation between the q-axis current command value and the q-axis current ($i_q$).

The PWM calculation unit (45) generates a control signal (G) for on-off control of the switching elements (Su, Sv, Sw, Sx, Sy, Sz) in the inverter circuit (13). Specifically, the PWM calculation unit (45) sets a duty ratio of the control signal (G) supplied to each of the switching elements (Su, Sv, Sw, Sx, Sy, Sz) based on the motor phase (θm), the DC voltage ($v_{dc}$), the d-axis voltage command value ($v_d*$), the q-axis voltage command value ($v_q*$), the d-axis voltage ($v_d$), and the q-axis voltage ($v_q$). When the control signal (G) is outputted, each switching element (Su, Sv, Sw, Sx, Sy, Sz) performs a switching operation (on-off operation) at the duty ratio set by the PWM calculation unit (45). The control signal (G) is periodically updated, and the switching operation in the inverter circuit (13) is controlled.

<Operation of Power Converter>

When the power converter (10) starts the operation, the converter circuit (11) performs full-wave rectification of the power source voltage ($v_{in}$), and outputs the full-wave-rectified voltage to the DC link (12). The DC link (12) receives the output of the converter circuit (11) as an input, and generates a DC voltage ($v_{dc}$) which pulsates at a frequency twice the frequency of the power source voltage ($v_{in}$). It can be assumed that the DC voltage ($v_{dc}$) is a constant value (hereinafter referred to as a "zero crossing voltage value (vdc0)") in a predetermined period around the zero crossing point (hereinafter referred to as a "near-zero crossing period (P0)") (see FIG. 2). The near-zero crossing period (P0) is a period including a time point where the power source voltage ($v_{in}$) is zero, and corresponds to a trough of the pulsation waveform of the DC voltage ($v_{dc}$).

In the power converter (10), the power source current command generator (42) generates a command value that pulsates in accordance with the frequency (e.g., 50 Hz) of the power source voltage ($v_{in}$) based on the power source phase ($θ_{in}$). When the power source current command value ($|i_{in}*|$) is generated, the current command calculation unit (46) generates the pulsation command value ($i_p*$). On the other hand, the compensation amount calculation unit (47) calculates the q-axis current command compensation amount ($i_{comp}$*) to reduce the deviation between the power source current command value (|$i_{in}$*|) and the absolute value of the power source current ($i_{in}$). Thus, the q-axis current command value ($i_q$*) is calculated.

When the q-axis current command value ($i_q$*) is calculated in this manner, the dq-axis current control unit (44) generates the d-axis voltage command value ($v_d$*) and the q-axis voltage command value ($v_q$*) based on the d-axis current command value ($i_d$*), the q-axis current command value ($i_q$*), and other suitable parameters. Thus, the control signal (G) is generated by the PWM calculation unit (45), and the switching operation in accordance with the control signal (G) is performed in the inverter circuit (13). As a result, the inverter circuit (13) supplies a predetermined AC power to the motor (30) to drive the motor (30).

At this time, the maximum value of the q-axis current ($i_q$) is further reduced than that in the conventional power converter. When the peak of the q-axis current ($i_q$) is reduced in this manner, the peak of the output torque of the motor (30) is also reduced. When a waveform is obtained through multiplication of a waveform, which is synthesized from a fundamental wave, a third harmonic, and a fifth harmonic that are based on the frequency of the voltage of the AC power source (20) and are extracted from the waveform of the power source current ($i_{in}$) at this time, by the polarity of the voltage of the AC power source (20), two or more extrema appear in the power source half cycle in the resulting waveform (i.e., a waveform similar to the waveform shown in FIG. 7).

Figure 15:
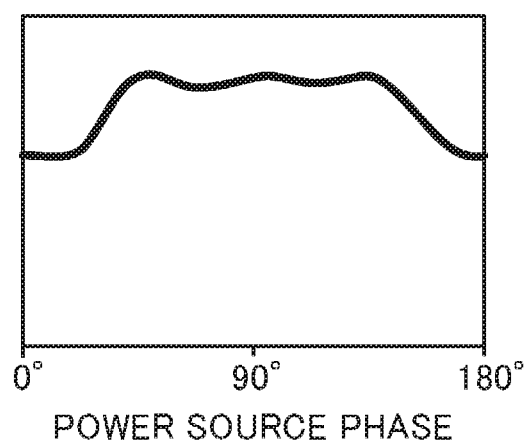
FIG. 15 illustrates a waveform of an absolute value of a motor current vector.
Figure 16:
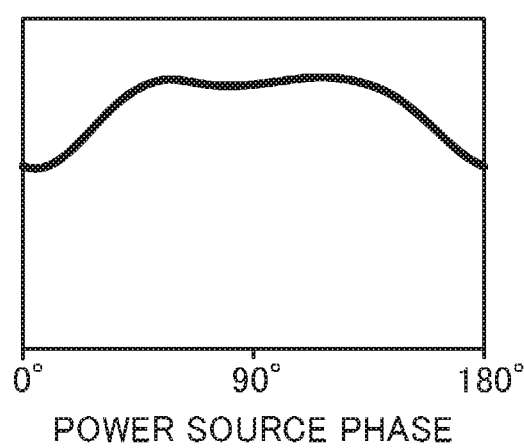
FIG. 16 illustrates an absolute value obtained from waveforms of second, fourth, and sixth harmonics which have a power source frequency as the fundamental frequency and are extracted from the waveform of the motor current vector.

Further, in the present embodiment, the absolute value of the motor current vector shows a waveform as shown in FIG. 15. FIG. 16 shows a waveform of an absolute value obtained from the waveforms of second, fourth, and sixth harmonics which have the power source frequency as the fundamental frequency and are extracted from the waveform of the motor current vector. Note that the motor current vector is a composite vector of the d-axis current vector and the q-axis current vector, and the absolute value of the motor current vector is an absolute value of the composite vector. The absolute value of the motor current vector may be considered as the absolute value of the current vector (Iα, Iβ) obtained through conversion of the three-phase alternating current in the motor (30) into a two-phase alternating current equivalent to the three-phase alternating current.

As can be seen from FIGS. 15 and 16, due to the control performed by the control unit (40) according to the present embodiment, two or more extrema appear in the power source half cycle in the waveform synthesized from the second, fourth, and sixth harmonics which have the power source frequency as the fundamental frequency and are extracted from the waveform of the absolute value of the motor current vector.

Advantages of Present Embodiment

As can be seen in the foregoing, in the present embodiment, generating the power source current command value (|$i_{in}$*|) having the maximum values as described above reduces the peak of the output torque of the motor. Accordingly, the effective value of the motor current is also educed, thereby improving the motor efficiency.

Second Embodiment

Figure 17:
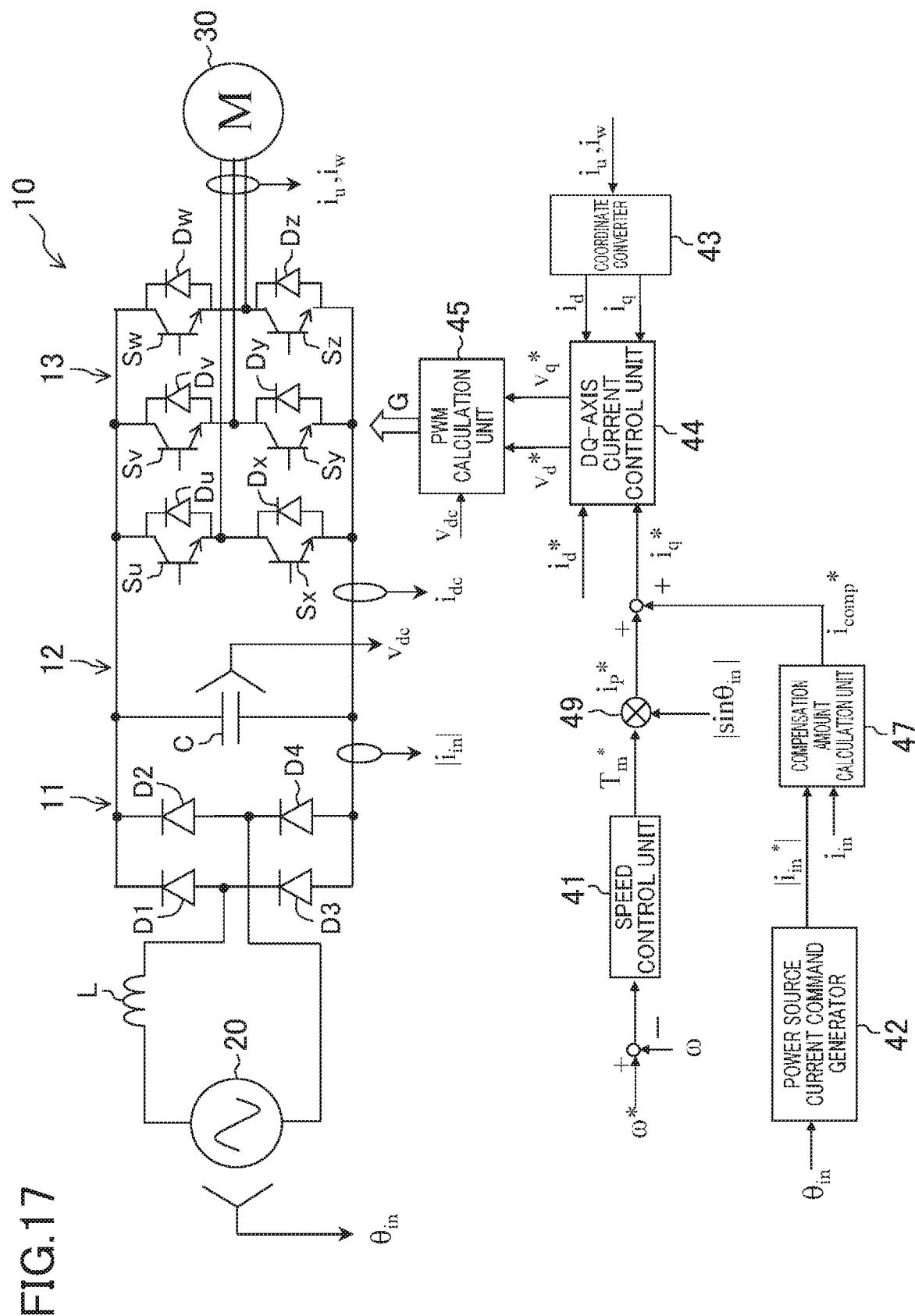
FIG. 17 is a block diagram illustrating a configuration of a power converter according to a second embodiment.

FIG. 17 is a block diagram showing a configuration of a power converter (10) according to a second embodiment of the present invention. In this embodiment, the current command calculation unit (46) is replaced with a multiplier (49). The multiplier (49) receives the average torque command value ($T_m$*) and the absolute value of the sine value of the power source phase ($\theta_m$) (i.e., |sin $\theta_{in}$|), and outputs the result of multiplication of these values as the pulsation command value ($i_p$*).

The power converter of this embodiment also includes the power source current command generator (42) and the compensation amount calculation unit (47). The power source current command generator (42) of this embodiment is configured, and generates the power source current command value (|$i_{in}$*|), in the same manner as the power source current command generator (42) of the first embodiment. The compensation amount calculation unit (47) of the present embodiment is configured in the same manner as the compensation amount calculation unit (47) of the first embodiment, and generates the q-axis current command compensation amount ($i_{comp}$*) based on the power source current ($i_{in}$) and the power source current command value (|$i_{in}$*|). In this embodiment, the q-axis current command compensation amount ($i_{comp}$*) is added to the pulsation command value ($i_p$*), thereby compensating for the amount of the power source current ($i_{in}$) that does not follow the power source current command value (|$i_{in}$*|).

With the configuration described above, the present embodiment also shows a waveform (roughly speaking, a trapezoidal waveform) in which a single large maximum value that appears in the power source half cycle in the conventional power converter is reduced. That is, also in this embodiment, two or more extrema appear in the power source half cycle in a waveform obtained through multiplication of a waveform, which is synthesized from a fundamental wave, a third harmonic, and a fifth harmonic that are based on the frequency of the voltage of the AC power source (20) and are extracted from the waveform of the power source current ($i_{in}$), by the polarity of the voltage of the AC power source (20). Although not shown, in the present embodiment as well, due to the control performed by the control unit (40), two or more extrema appear in the power source half cycle in waveform synthesized from the second, fourth, and sixth harmonics which have the power source frequency as the fundamental frequency and are extracted from the waveform of the absolute value of the motor current vector.

In this manner, the effective value of the motor current can be further reduced than that in the conventional power converter.

Third Embodiment

Figure 18:
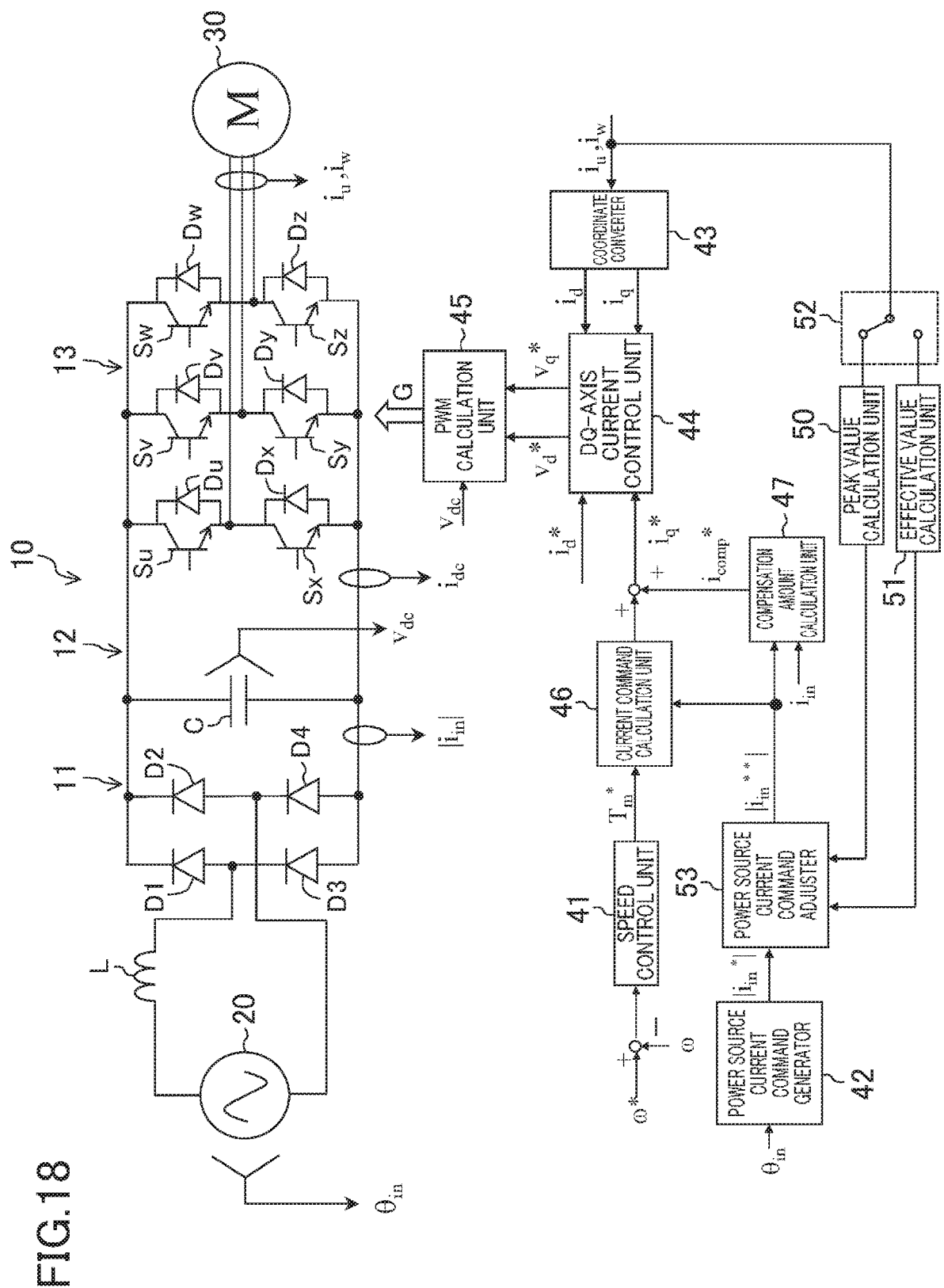
FIG. 18 is a block diagram illustrating a configuration of a power converter according to a third embodiment.

In a third embodiment of the present invention, it will be described below an example in which the power source current command value (|$i_{in}$*|) is adjusted online (i.e., adjusted during the operation of the power converter (10)). FIG. 18 is a block diagram showing a configuration of a power converter (10) according to the third embodiment of the present invention. In the power converter (10) of the present embodiment, a peak value calculation unit (50), an effective value calculation unit (51), a selector (52), and a power source current command adjuster (53) are added to the power converter (10) of the first embodiment.

The peak value calculation unit (50) is configured to obtain the peak values of the u-phase current (iu) and the w-phase current (iw). The effective value calculation unit (51) is configured to calculate the effective values of the u-phase current (iu) and the w-phase current (iw). The selector (52) switches whether to input the u-phase current (iu) or the w-phase current (iw) to either of the peak value calculation unit (50) or the effective value calculation unit (51). The selector (52) performs the switching depending on whether the operating point is intended to the reduction of the peak of the motor current or the reduction of the effective value of the motor current, for example.

The power source current command adjuster (53) adjusts a parameter constituting the power source current command value ($|i_{in}*|$) to reduce the peak of the motor torque (or the current) or the peak of the effective value of the current, and outputs the adjustment result (will be hereinafter referred to as an "adjusted power source current command value ($|i_{in}**|$)") to the current command calculation unit (46) and the compensation amount calculation unit (47). The parameter constituting the power source current command ($|i_{in}*|$) is a parameter for determining the waveform of the power source current ($i_{in}$). More specifically, this parameter includes a harmonic (third and fifth harmonics) to be superimposed on the fundamental wave to generate the power source current command value ($|i_{in}*|$), and the length of the nonconducting period. In this manner, the parameter constituting the power source current command value ($|i_{in}*|$) is adjusted because the torque waveform of the motor (30) depends on the power source current ($i_{in}$) (see Formulae (5) and (6)).

As a specific method for adjusting the parameter, for example, a hill-climbing method may be used. Specifically, when the peak value calculation unit (50) is selected by the selector (52), the amplitude of the harmonic and the length of the nonconducting period are adjusted by the hill-climbing method to reduce the peak of the phase current (iu, iw). When the effective value calculation unit (51) is selected by the selector (52), the amplitude of the harmonic and the length of the nonconducting period are adjusted by the hill-climbing method to reduce the peak of the effective value of the current. This makes it possible to change the waveform of the power source current command value ($|i_{in}*|$) depending on the purpose.

The adjusted power source current command value ($|i_{in}**|$) obtained in this manner also has a waveform similar to that of the power source current command value ($|i_{in}*|$). When a waveform is obtained through multiplication of a waveform, which is synthesized from a fundamental wave, a third harmonic, and a fifth harmonic that are extracted and based on the frequency of the voltage of the AC power source (20), by the polarity of the voltage of the AC power source (20), two or more extrema appear in the power source half cycle in the resulting waveform. In the present embodiment, the current command calculation unit (46) and the compensation amount calculation unit (47) operate by using the adjusted power source current command value ($|i_{in}**|$), instead of the power source current command value ($|i_{in}*|$).

Therefore, in this embodiment as well, the peak of the output torque of the motor is reduced, and accordingly, the effective value of the motor current is also reduced. This can improve the motor efficiency. That is, also in the present embodiment, the same advantages as those of the first embodiment can be obtained.

Instead of adjusting the parameters during the operation of the power converter (10), a plurality of types of tables (see the first embodiment) may be provided in advance in the memory device, and these tables may be switched in accordance with the calculation results of the peak value calculation unit (50) and the effective value calculation unit (51). In this case, the output of the peak value calculation unit (50) and the output of the effective value calculation unit (51) may be connected to the power source current command generator (42), and the tables may be switched in accordance with the output of the peak value calculation unit (50) in the power source current command generator (42). Thus, the waveform of the power source current command value ($|i_{in}*|$) can be changed in accordance with the load of the inverter circuit (13).

Although not shown, in the present embodiment as well, due to the control performed by the control unit (40), two or more extrema appear in the power source half cycle in the waveform synthesized from the second, fourth, and sixth harmonics which have the power source frequency as the fundamental frequency and are extracted from the waveform of the absolute value of the motor current vector.

Fourth Embodiment

Figure 19:
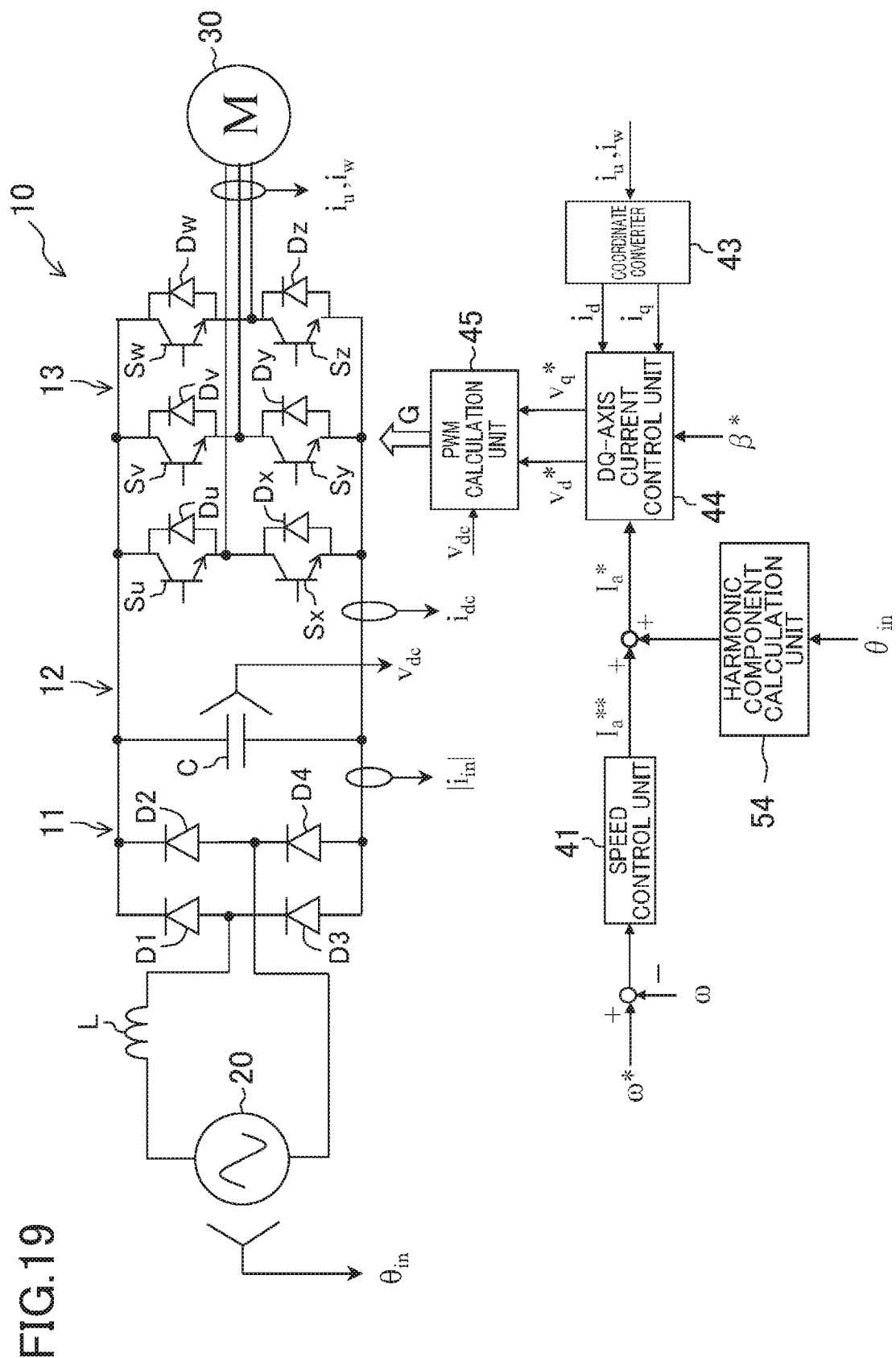
FIG. 19 is a block diagram illustrating a configuration of a power converter according to a fourth embodiment.

FIG. 19 is a block diagram illustrating a configuration of a power converter (10) according to a fourth embodiment. In this embodiment, the configuration of the control unit (40) is different from that of the first embodiment and other embodiments. The control unit (40) of this embodiment includes a speed control unit (41), a coordinate converter (43), a dq-axis current control unit (44), a PWM calculation unit (45), and a harmonic component calculation unit (54). The coordinate converter (43) and the PWM calculation unit (45) have the same configuration as those of the first embodiment.

The speed control unit (41) performs so-called PI operation based on the difference between the rotation number command value ($\omega^*$) and the number of rotations ($\omega$), and outputs the result. The output of the speed control unit (41) will be hereinafter referred to as a "speed command value (Ia**)."

The harmonic component calculation unit (54) receives the power source phase ($\theta_{in}$), and using the information, generates and outputs a signal having a waveform obtained through synthesis of signals respectively corresponding to second, fourth, and sixth harmonics having the power source frequency as the fundamental frequency. The output of the harmonic component calculation unit (54) and the output of the speed control unit (41) (referred to as the "speed command value (Ia**)") are added together, and the addition result (referred to as a "current vector command value (Ia*)") is inputted to the dq-axis current control unit (44). In the present embodiment, the current vector command value (Ia*) is used as a command value of the absolute value of the motor current vector.

The dq-axis current control unit (44) receives a command value of the phase of the current vector of the motor (30) (hereinafter referred to as a "current phase command ($\beta^*$)") and the current vector command value (Ia*). Using these inputs, the dq-axis current control unit (44) generates a d-axis voltage command value (vd*) and a q-axis voltage command value (vq*).

Figure 20:
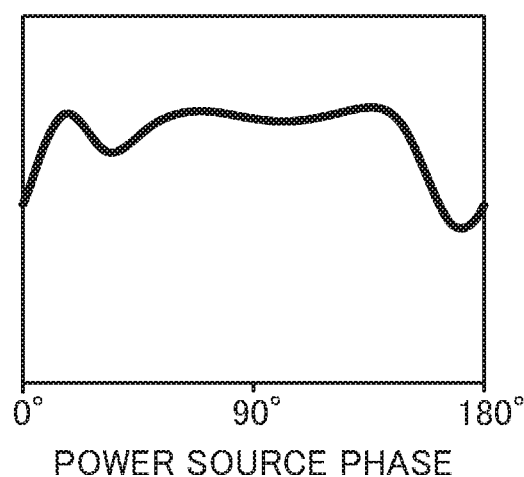
FIG. 20 illustrates a waveform (a value measured in a power source half cycle) of an absolute value of a motor current vector according to the fourth embodiment.
Figure 21:
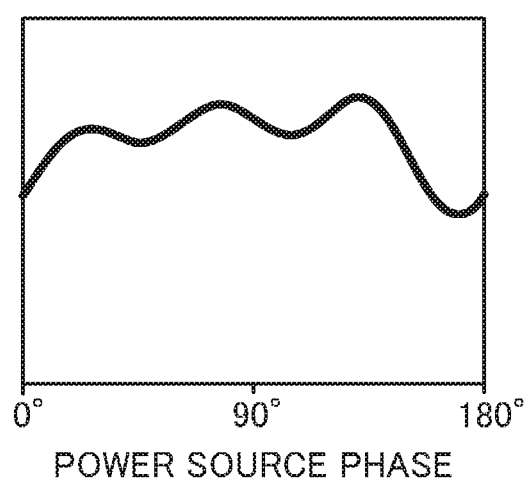
FIG. 21 illustrates a waveform (in a power source half cycle) of a current vector command value according to the fourth embodiment.

FIG. 20 shows the waveform of the absolute value of the motor current vector in the present embodiment (the value measured in the power source half cycle). FIG. 21 shows a waveform obtained through synthesis of second, fourth, and sixth harmonics which have the power source frequency as the fundamental frequency and are extracted from the waveform of the absolute value of the motor current vector. As shown in FIG. 21, in the present embodiment as well, due to the control performed by the control unit (40), two or more extrema appear in the power source half cycle in the waveform synthesized from the second, fourth, and sixth harmonics which have the power source frequency as the fundamental frequency and are extracted from the waveform of the absolute value of the motor current vector.

Therefore, in the present embodiment as well, the peak of the output torque of the motor is reduced. Accordingly, the effective value of the motor current is also reduced, thereby improving the motor efficiency.

Fifth Embodiment

Figure 22:
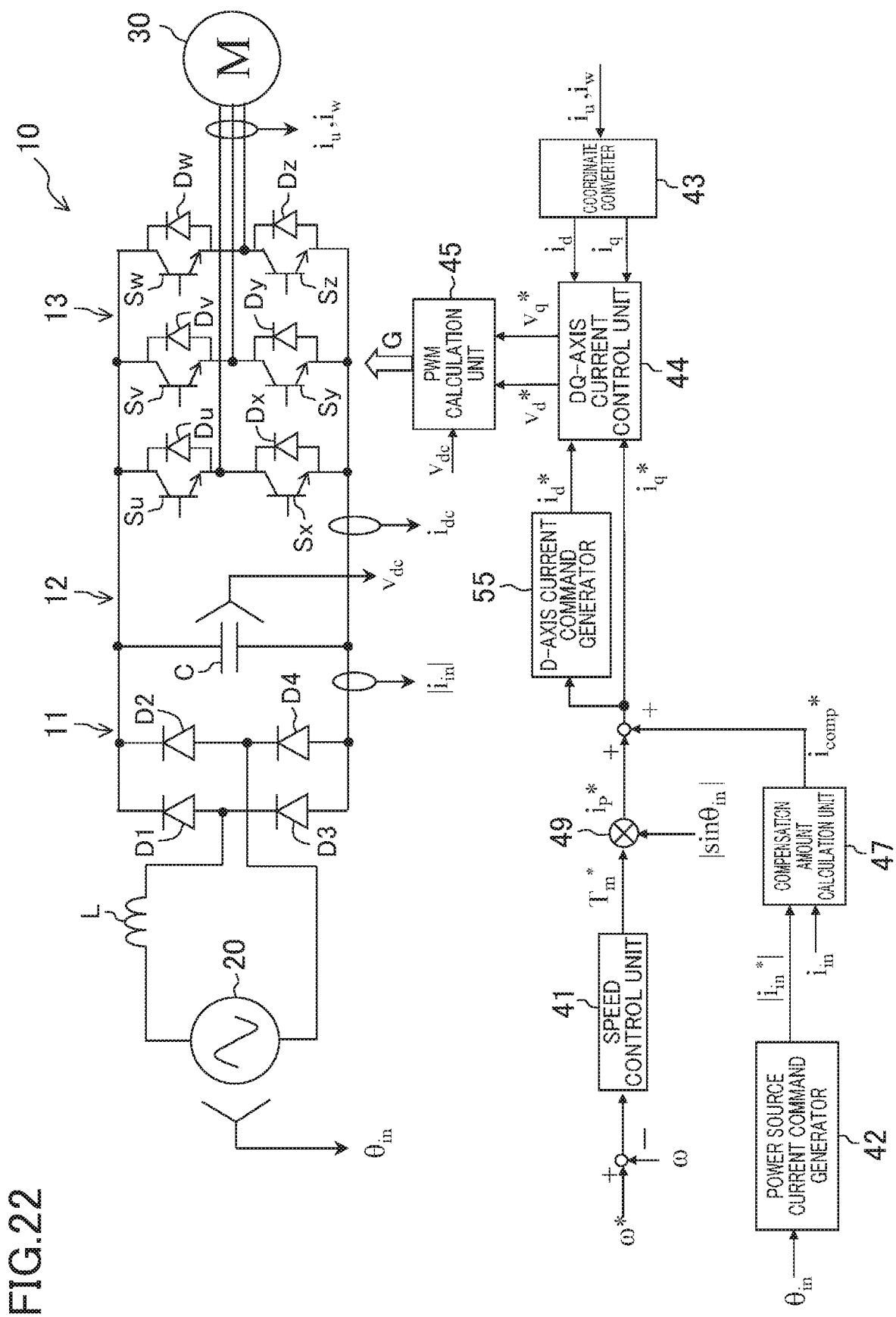
FIG. 22 is a block diagram illustrating a configuration of a power converter according to a fifth embodiment.

FIG. 22 is a block diagram illustrating a configuration of a power converter (10) according to a fifth embodiment. The power converter (10) of this embodiment is a modification of the power converter (10) of the second embodiment. Specifically, as shown in FIG. 22, a d-axis current command generator (55) is added to the control unit (40).

The d-axis current command generator (55) generates a d-axis current command value ($i_d$*) by using the q-axis current command value ($i_q$*). More specifically, the d-axis current command generator (55) modulates a predetermined constant value using second, fourth, and sixth harmonics, which are included in the q-axis current command value ($i_q$*) and have the power source frequency as the fundamental frequency, thereby generating the d-axis current command value ($i_d$*).

In this way, compared to the example of the second embodiment, two or more extrema can appear more reliably in the power source half cycle in a waveform synthesized from the second, fourth, and sixth harmonics which have the power source frequency as the fundamental frequency and are extracted from the waveform of the absolute value of the motor current vector. Therefore, also in the present embodiment, the peak of the output torque of the motor can be reduced. Accordingly, the effective value of the motor current can also be reduced in the present embodiment, thereby improving the motor efficiency.

Other Embodiments

Figure 23:
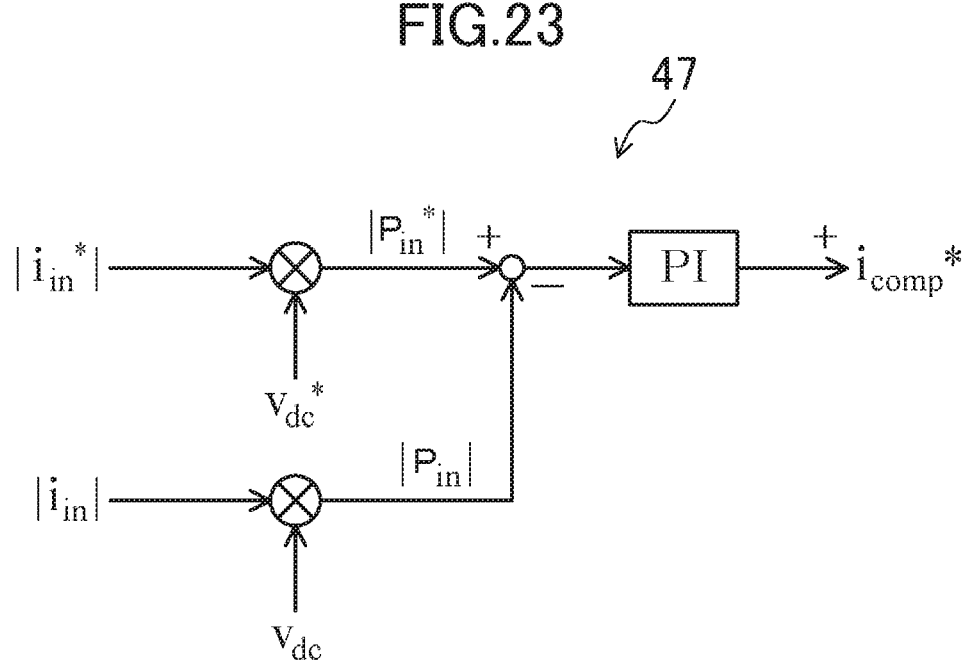
FIG. 23 illustrates another example of a compensation amount calculation unit.

The configuration of the compensation amount calculation unit (47) is merely an example, and is not limited to the above configuration. FIG. 23 shows another configuration example of the compensation amount calculation unit (47). In the example of FIG. 23, a command value ($P_{in}$*) of electric power is generated from the power source current command value (|$i_{in}$*|) and the command value ($v_{dc}$*) of the DC voltage ($v_{dc}$), and the present electric power ($P_{in}$) is obtained from the power source current ($i_{in}$) and the DC voltage ($v_{dc}$). In this example, proportional-integral (PI) operation is performed based on the deviation between the present electric power ($P_{in}$) and the command value ($P_{in}$*) of the electric power to obtain the q-axis current command compensation amount ($i_{comp}$*). The q-axis current command compensation amount ($i_{comp}$*) can also be used to reduce the deviation between the power source current command value (|$i_{in}$*|) and the absolute value of the power source current ($i_{in}$), similarly to the q-axis current command compensation amount ($i_{comp}$*) of the respective embodiments.

Use of the power converter (10) is not limited to the air conditioner. The power converter can also be applied to various devices having a motor that receives electric power from the power converter (10).

The value of the phase current such as the u-phase current (iu) or the v-phase current (iv) may be calculated from a DC link current (idc), for example.

A matrix converter may also be used as the power converter.

What is claimed is:

1. A power converter comprising:
   a plurality of switching elements, the power converter being usable to convert power inputted from an AC power source into AC power of a predetermined frequency through a switching operation by the switching elements to supply the converted AC power to a motor;
   a converter circuit that rectifies an AC voltage of the AC power source;
   a DC link that receives an output of the converter circuit as an input and generates a DC voltage that pulsates in accordance with a frequency of the AC voltage;
   an inverter circuit that converts the DC voltage generated by the DC link into an AC voltage of a predetermined frequency through the switching operation and outputs the converted AC voltage; and
   a control unit that controls the switching operation,
   a capacitance value of a capacitor is set so that a maximum value of the DC voltage becomes twice or more of a minimum value thereof, and
   the control unit controls the switching elements such that two or more extrema
      appear in a power source half cycle in a waveform synthesized from second, fourth, and sixth harmonics that have a power source frequency as a fundamental frequency and
      are extracted from a waveform of an absolute value of a motor current vector.

2. The power converter of claim 1,
   the control unit controls the inverter circuit such that a power source current is nonconducting for a certain period.

* * * * *